US006795412B1

United States Patent
Lee

(10) Patent No.: US 6,795,412 B1
(45) Date of Patent: Sep. 21, 2004

(54) METHOD AND APPARATUS WHICH INCLUDES A START OF MESSAGE INDICATOR (SMI) IN A 3GPP DOWN LINK DEDICATED PHYSICAL CONTROL CHANNEL (DL DPCCH)

(75) Inventor: Young Dae Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 730 days.

(21) Appl. No.: 09/675,149

(22) Filed: Sep. 29, 2000

(30) Foreign Application Priority Data

Oct. 2, 1999 (KR) ........................................ 1999-42478

(51) Int. Cl.[7] ................................................ H04Q 7/00
(52) U.S. Cl. ..................................... 370/329; 370/442
(58) Field of Search ................................ 370/310, 329, 370/336, 335, 342, 345, 347–8, 431, 437–9, 441, 442–4, 469; 455/403, 422, 455

(56) References Cited

PUBLICATIONS

Yang et al., Migration to all–IP based UMTS networks, IEEE, Mar. 27, 2000.*
Babich et al., Transmission of embedded VBR multimode encoded speech on UMTS Common Packet Channels, IEEE, Sep. 24, 2000, pp1405–1411.*
"Universal Mobile Telecommunications System (UMTS); Physical channels and mapping of transport channels onto physical channels (FDD) (3GPP TS 25.211 version 3.4.0 Release 1999)", ETSI TS 125 211 V3.4.0, XX,XX, Page (S) Complete(44) XP002185178.

"Universal Mobile Telecommunications Systems (UMTS); Physical layer procedures (FDD) (3GPP TS 25.214 version 3.4.0 Release 1999)", ETSI TS 125 214 V3.4.0, XX, XX, pp. 1–47 XP002173278.

3GPP TSG RAN WG1: "TS 25.214 V1.0.0: Third Generation Partnership Project (3GPP); Technical Specification Group (TSG); Radio Access Network (RAN); Working group 1 (WG1); Spreading and Modulation (FDD) Physical Layer Procedure", TS 25.214 V1.0.0, XX, XX, pp. 1–31 XP002180896.

"Universal Mobile Telecommunications System (UMTS); Physical channels and mapping of transport channels onto physical channels (FDD) (3GPP TS 25.211 version 2.1.0 Jun. 1999)", ETSI TS 125 211 V2.1.0, Jun. 1999, XP002196121.

* cited by examiner

Primary Examiner—David Vincent
(74) Attorney, Agent, or Firm—Fleshner & Kim, LLP

(57) ABSTRACT

Method of allocating a common packet which can allocate a correct common packet channel (CPCH), the method including transporting, at a base station (BS), a common packet channel control command (CCC) to a user equipment (UE) through a dedicated physical channel (DPCH) when a power control preamble is transported from the user equipment, and transporting, at the user equipment, a common packet channel message to the base station through the common packet channel when the common packet channel control command is received within a predetermined time, thereby providing stable telecommunication services.

37 Claims, 10 Drawing Sheets

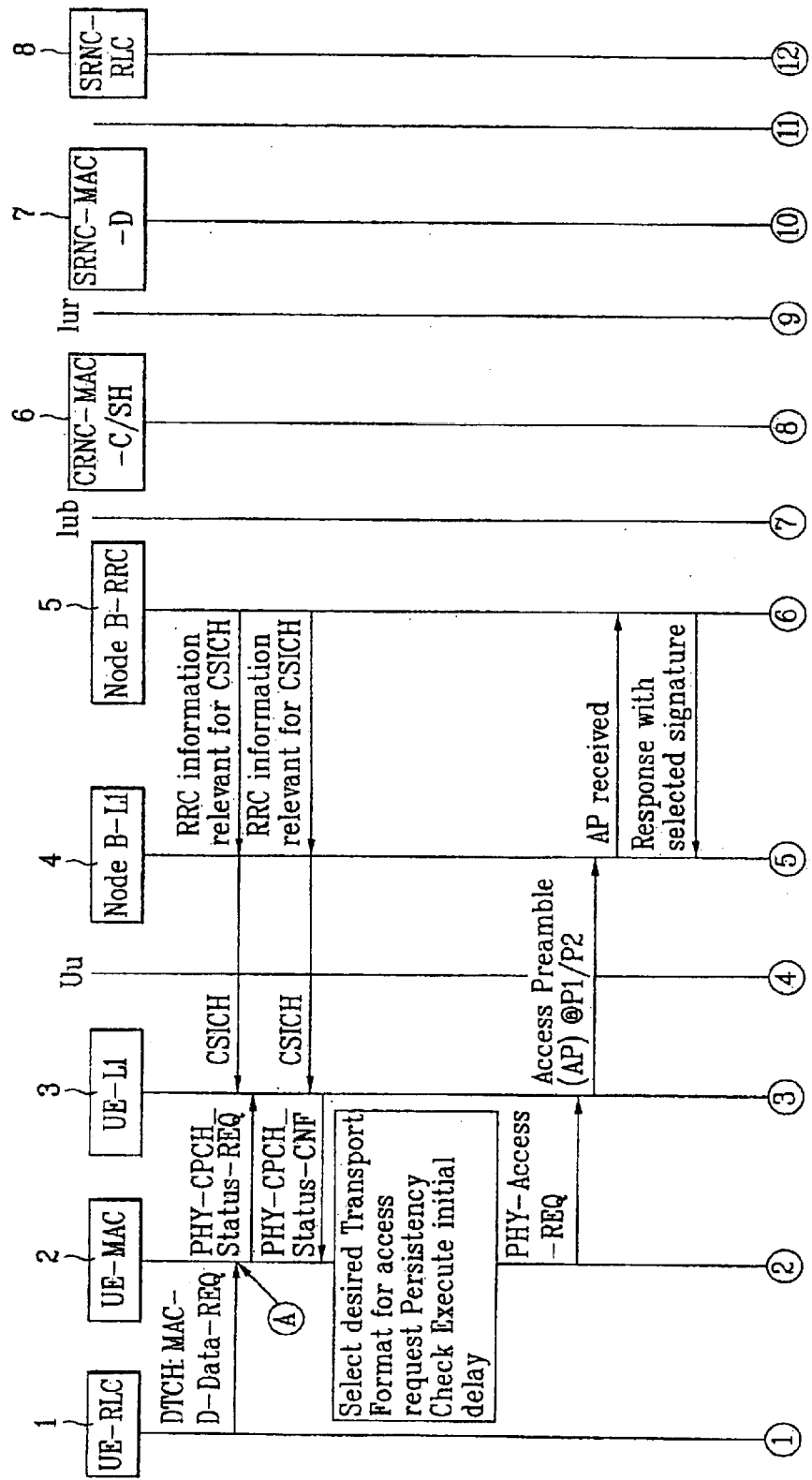

FIG.6

| Slot Format #i | Channel Bit Rate (kbps) | Channel Symbol Rate (ksps) | SF | Bits/Slot | DPCCH Bits/Slot | | | | Transmitted slots per radio frame |
|---|---|---|---|---|---|---|---|---|---|
| | | | | | $N_{TPC}$ | $N_{TFCI}$ | $N_{CCC}$ | $N_{pilot}$ | $N_{Tr}$ |
| 0 | 15 | 7.5 | 512 | 10 | 2 | 0 | 4 | 4 | 15 |

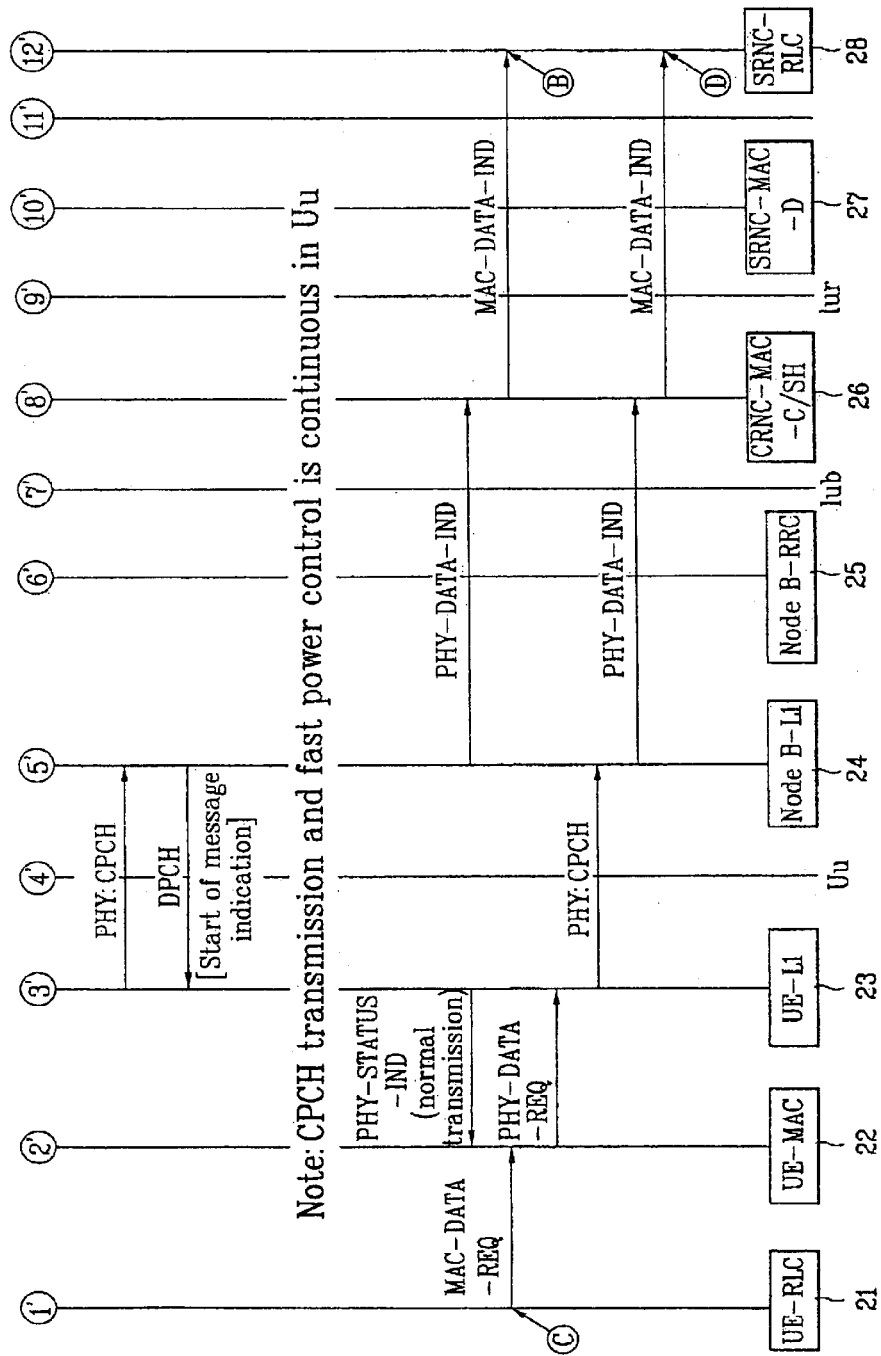

FIG.8

| Slot Format #i | Channel Bit Rate (kbps) | Channel Symbol Rate (ksps) | SF | Bits/Slot | DPCCH Bits/Slot | | | | Transmitted slots per radio frame |
|---|---|---|---|---|---|---|---|---|---|
| | | | | | $N_{TPC}$ | $N_{TFCI}$ | $N_{CCC}$ | $N_{pilot}$ | $N_{Tr}$ |
| 0 | 15 | 7.5 | 512 | 10 | 2 | 2 | 2 | 4 | 15 |

METHOD AND APPARATUS WHICH INCLUDES A START OF MESSAGE INDICATOR (SMI) IN A 3GPP DOWN LINK DEDICATED PHYSICAL CONTROL CHANNEL (DL DPCCH)

BACKGROUND OF THE INVENTION

1. Field of the Invention

The present invention relates to a next generation mobile communication system, and more particularly to a method of allocating a common packet channel (CPCH) in a next generation mobile communication system which can allocate a correct common packet channel (CPCH).

2. Discussion of the Related Art

Recently, ARIB and TTC in Japan, ETSI in Europe, T1 in U.S.A., and TTA in Korea have organized a Third Generation Partnership Project (3 GPP) to establish a technical standard for the mobile communication system of the next generation.

In the searches of the 3 GPP, the searches of UTRAN provide a definition and explanation of a transport channel and a physical channel.

Referring to the pertinent searches, a common packet channel (CPCH), which is one of the transport channels, is allocated between a base station (BS) and a user equipment (UE) to transport relatively long data from the UE to the BS through an Up-Link (UL). The Up-Link common packet channel (CPCH) is related to a dedicated channel (DCH), which is a channel for performing a close loop power control, while the DCH is mapped by a dedicated physical control channel (DPCCH). Such a CPCH is allocated to diverse UB by means of a random access manner.

The efficient allocation of the CPCH is currently recognized as being critical to avoiding a collision of the allocated channel when the CPCH is allocated in 3 GPP.

FIG. 1 illustrates a transporting manner of the common packet channel (CPCH) in the related art, and FIG. 2 illustrates a structure of a Down Link dedicated physical control channel (DL DPCCH) for the common packet channel (CPCH) in the related art.

The CPCH manner includes a CPCH Status Indicator Channel, which transports information on the availability and maximum transport rate of the CPCH provided by a base station, a Physical Common Packet Channel Access Preamble (PCPCH AP) section for requesting a use of a specific physical common packet channel (PCPCH), an AP-Acquisition indicator Channel (AICH) for transporting a response for the AP, a PCPCH Collision Detection Preamble (CD-P) section for a collision detection and a resolution, a collision Detection/Channel Assignment Indicator Channel for a response and the channel allocation to the CD-P, a PCPCH. Power Control Preamble (PC-P) section having a length of 0 or 8 slots for determining the transport power level before transporting the data, a DL Dedicated Physical Control Channel (DPCCH) for providing an inner loop power control, a PCPCH message section for transporting a user packet data as shown in FIG. 1. Here, the PCPCH message section is divided into a PCPCH message data section and a PCPCH message control section.

Meanwhile, the CPCH in 3 GPP operates in two modes. One is a UE channel selection method (UCSM), which selects the CPCH, and the other is a versatile channel assignment method (VCAM), which informs the UE after a Node B corresponding to the base station allocates the CPCH.

The CPCH Status Indicator Channel (CSICH) in the UCSM periodically transports information on availability of each CPCH.

The CSICH in VCAM periodically transports the information on the availability and the maximum transport rate of each CPCH.

The Access Preamble (AP), the Collision Detection Preamble (CDP), and AP-AICH transport one of the 16 signature sets having 16 lengths. The AP signature in the UCSM indicates a specific channel, i.e., a scrambling code of the specific channel.

AP signature in VCAM indicates a data transport rate desired by the UE. In the VCAM, specific channels are indicated by means of an AP signature, a signature of CD/CA-ICH, and a code.

Of the 16 signature sets having 16 lengths that are different from one another, 8 pieces are used for a response to the CD-P, while the other 8 pieces are used for a channel allocation.

CD/CA-ICH transports one of 8 signatures for the CD-P response in the UCSM method, while simultaneously transporting one of the 8 signatures for the CDOP response and one of the 8 signatures for the channel allocation in the VCAM. Accordingly, the two signatures are transported at the same time for different purposes according to the VCAM method.

FIG. 2 shows a structure of the DL Dedicated Physical Channel (DPCH) in the related art, which comprises a Dedicated Physical Control Channel (DPCCH) and a Dedicated Physical Data Channel (DPDCH). The DL DPCCH includes a Pilot, TPC, and TFCI, while the DL DPDCH includes a data channel.

FIGS. 3A–3C are timing sequence diagrams 10 explain a process of transporting the normal common packet channel in the related art.

FIGS. 3A–3C illustrate the process of transporting the common packet channel for a transport block set between a serving user radio network controller and a radio link control (SRNC-RLC) in a user equipment radio link control (UE RLC).

First, the UE performs the CPCH configuration for transporting the CPCH through a Radio Resource Control (RRC) procedure such as a radio bearer setup or a transport channel reconfiguration.

That is, the Medium Access Control (MAC) layer 2 of the UE receiving a request for transport of the data from the Radio Link Control (RLC) layer 1 of the UE through MAC-D-Data-REQ requests to layer 3 of the UE a status report of the CPCH through PHY-CPCH-Status-REQ. The status report is broadcasted through the CSICH using a channelization code such as an AP-AICH.

The L1 layer 3 of the UE receives the status report from the CSICH and transfers the same to the MAC layer 2 of the UE through PHY-CPCH-Status-CNF.

The MAC layer 2 of the UE selects a transport format for requesting CPCH access from the CSICH, and requests L1 layer 3 of the UE an access through PHY-Access-REQ alter delay of a specific length by performing a persistency check in accordance with the persistency value. At this stage, the L1 layer 3 of the UE forwards the AP with the first power P1. Next, the L1 layer 3 of the UE forwards the AP once again with the second power P2, which is higher than the first power P1 when a response for the AP is not received after elapse of a predetermined time.

An L1 layer 4 of the base station (Node B), which has received the AP from the L1 layer 3 of the UE, informs the received information to the RRC 5 of the base station (Node B), selects and transports the specific signature to the L1 layer 3 of the UE through AP-AICH. At this stage, the ACK message is forwarded according to the signature of the AP-AICH.

The L1 layer 3 of the UE, which has received the ACIC through AP-AICH, transports the CDP P to the L1 layer 4 of the base station (Node-B). The base station rode-B), which has received the CD-P selects the specific signature and transports the CD/CA-ICH.

The CD/CA-ICH in the UCSM only reply to the CD-P, while the CD/CA-ICH in the VCAM performs a reply and a channel allocation for the CD-P. At this time, the information on the channel allocation in the VCAM defines a scrambling code for the PC-P and the CPCH message section (the CPCH message data section, the CPCH message control section) in the L1 layer 3 of the UE.

The MAC layer 2 of the UE, which has received the PHY-Access-CNF front the L1 layer of the UE, selects the transport format of the CPCH and requests the data transport through PHY-Data-REQ after making a transport block set.

The L1 layer 3 of the UE, which has received PHY-Data-REQ, transports the message after establishing the transport power control preamble (PC-P) of 0 or 8 slot length. The data transport through the CPCH is continuously performed until all the data are transported, or to the end of the maximum frame length designated by the system.

The information on ACK or NAK of the RNC/RLC layer 8 is forwarded to the RLC layer 1 of the UE through the FACH, FIGS. 3A–3C shows a process of transporting the CPCH for a transport block set, which is transported first from point A to point B, and a process of transporting the CPCH for each linked transport block set from point C to point D.

SUMMARY OF THE INVENTION

To solve at least the problems and disadvantages of the related art, an object of the present invention is to provide a method of allocating CPCH in a mobile communication system of next generation, by which the UE can transport data through correct utilization of the CPCH allocated by a base station Additional advantages, objects, and features of the invention will be set forth in part in the following description and will become apparent to those having ordinary skill in the art upon examination of the following or may be learned from practice of the invention. The objects and advantages of the invention may be realized and attained as particularly pointed out in the appended claims.

To achieve the above object in accordance with one aspect of the present invention, there is provided a method of allocating a CPCH in a mobile communication system of next generation, the method comprising the steps of: transporting at a base station (BS) a common packet channel control command (CCC) to a M through a DPCH when a power control preamble is transported from the UE; and transporting at the UE a common packet channel message to the base station through the common packet channel when the common packet channel control command is received within a predetermined time.

BRIEF DESCRIPTION OF THE DRAWINGS

The invention will now be described in detail by reference to the accompanying drawings, in which:

FIGS. 3A–3C are timing sequence diagrams to explain a process of transporting the normal common packet channel in the related art;

FIG. 6 is a diagram illustrating a first format of the DL DPCCH for CPCH according to the present invention;

FIGS. 7A–7C are diagrams illustrating the process of transporting the normal CPCH according to the present invention;

FIG. 8 is a diagram illustrating a second format of the DL DPCCH for CPCH according to the present invention.

DETAILED DESCRIPTION OF THE INVENTION

Figure 1:
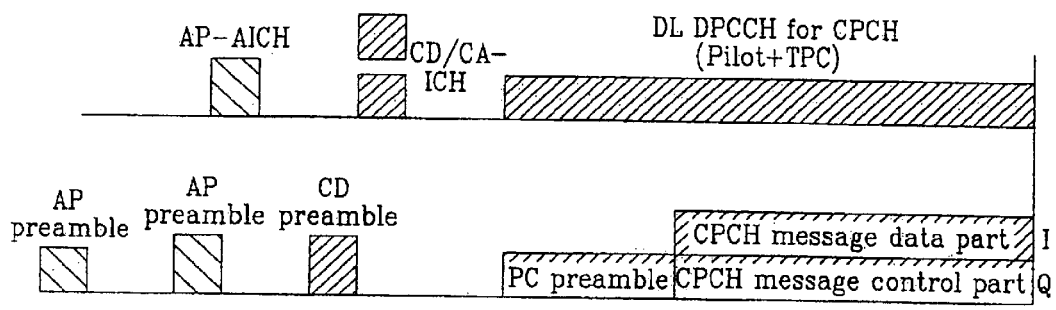
FIG. 1 illustrates a transport manner of a common packet channel (CPCH) in the related art.
Figure 2:
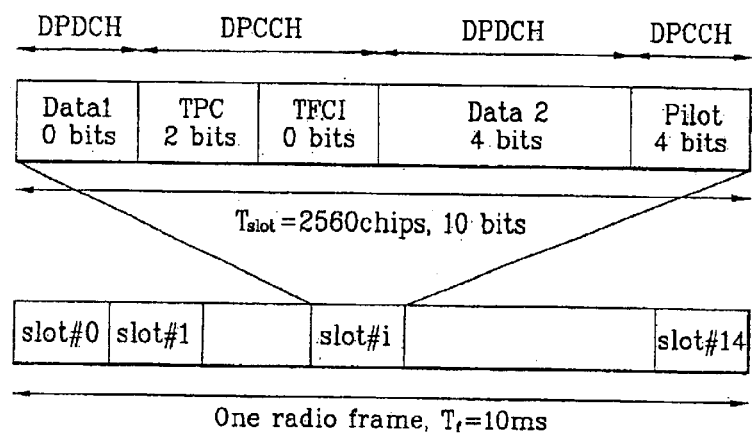
FIG. 2 illustrates a structure of a Down Link dedicated physical control channel (DL DPCCH) for a common packet channel (CPCH) in the related art.
Figure 3B:
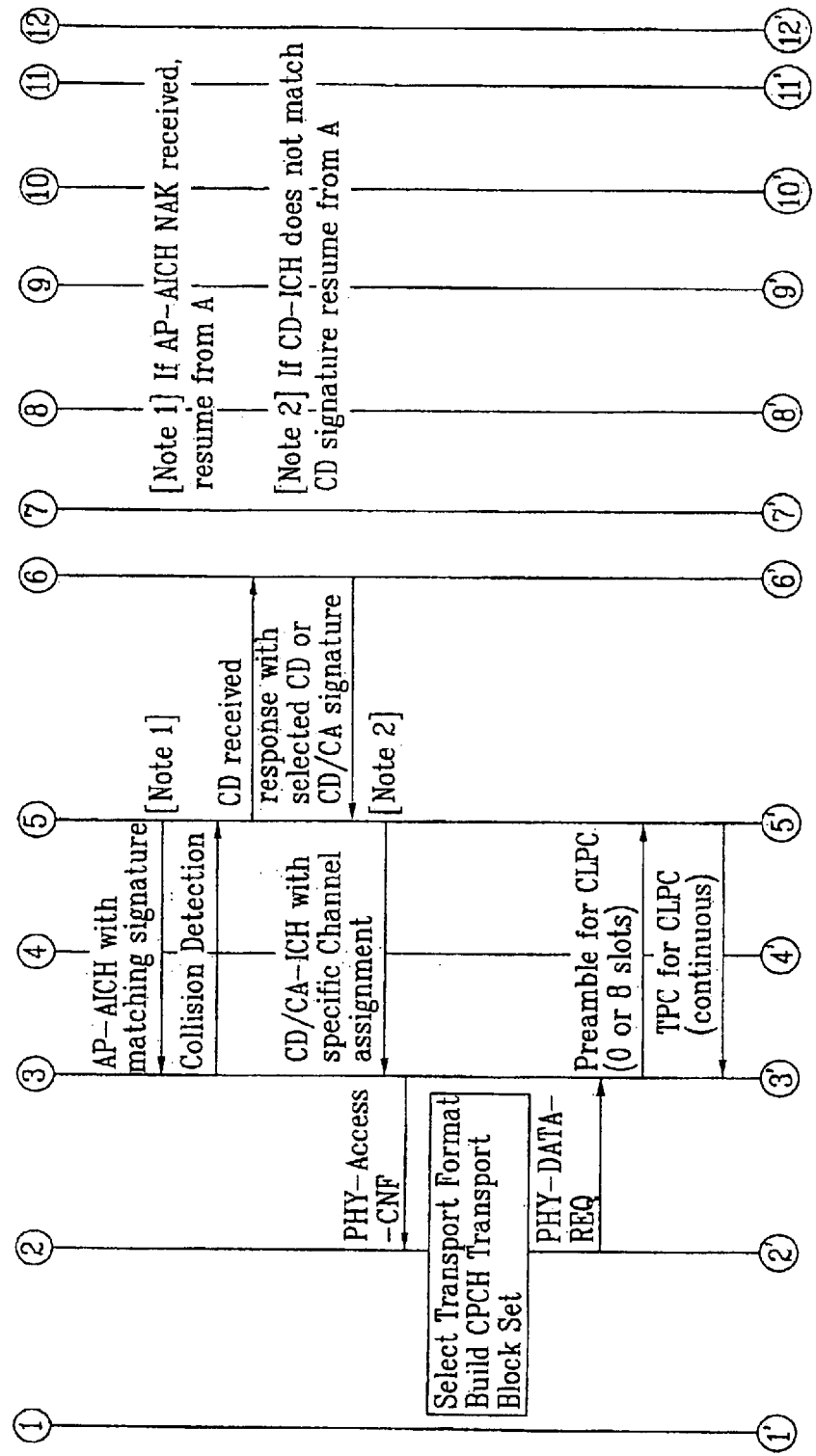
Figure 3C:
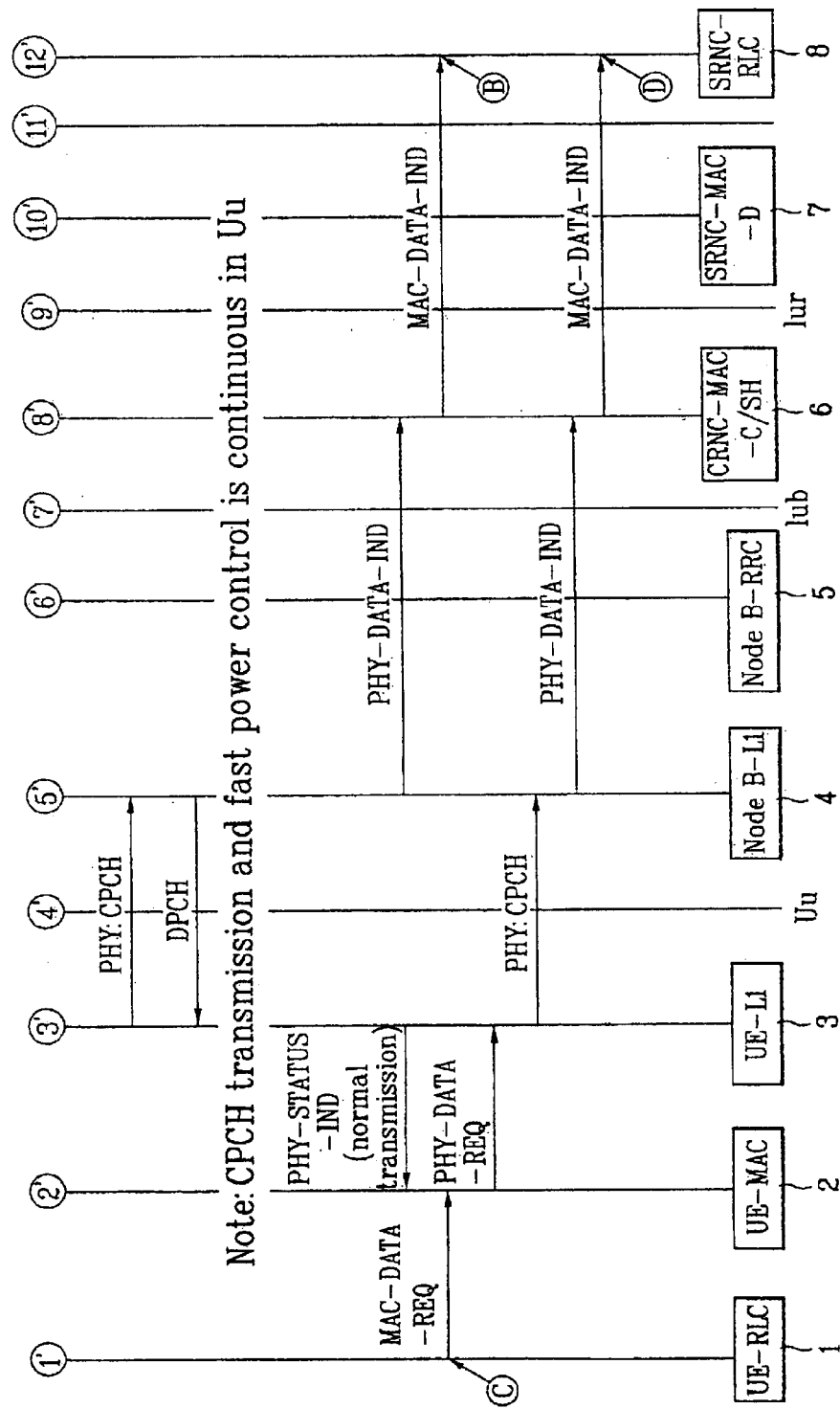
Figure 4:
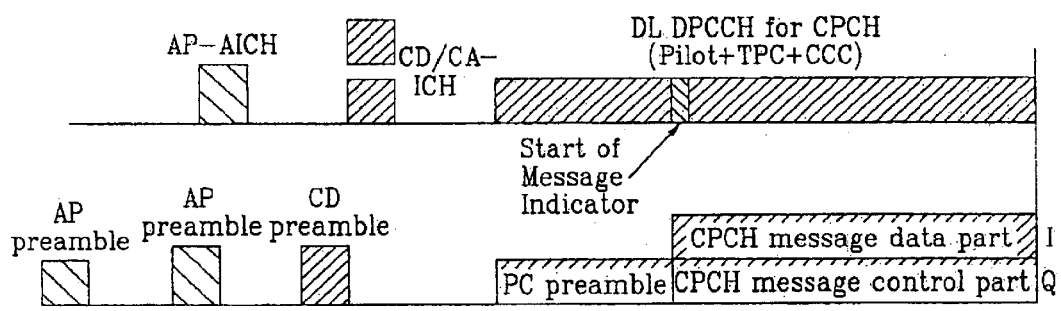
FIG. 4 is a diagram illustrating a transporting manner of CPCH according to the present invention.
Figure 5:
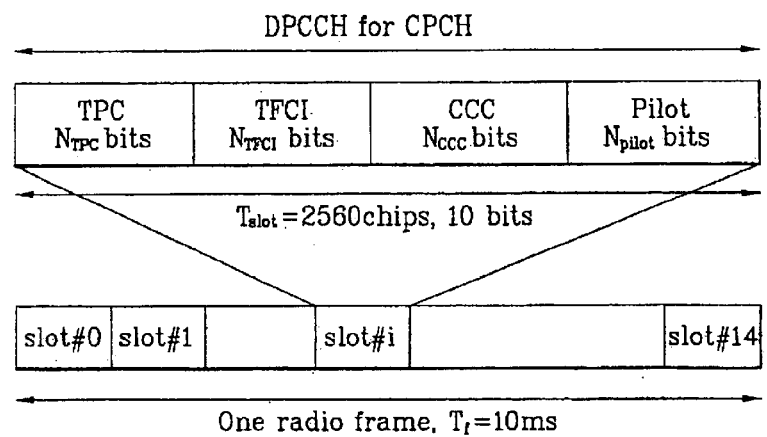
FIG. 5 is a diagram illustrating a structure of the DL DPCCH for CPCH according to the present invention.

FIG. 4 is a diagram illustrating a transporting manner of CPCH according to the present invention, and FIG. 5 is a diagram illustrating a structure of the DL DPCCH for CPCH according to the present invention. FIG. 6 is a diagram illustrating a first format of the DL DPCCH for CPCH according to the present invention.

The characteristic feature of the CPCH manner according to the present invention distinguished from the conventional CPCH manner lies in transport of the start of message indicator through DL DPCH, as shown in FIG. 4. For that purpose, the present invention transports not only the information on pilot and transport power control (TPC) but also the information on the CPCH control command (CCC) to the DL DPCH, as shown in FIG. 4. This was to resolve the problem of the related art lacking the same.

In other words, the DL DPCCH according to the present invention transports the information on control only, thereby not necessitating the DL DPDCH. To be specific, the DL DPCCH for CPCH according to the present invention comprises the information on pilot, TPC, transport format combination indicator (TFCI) and CCC. Here, the information on the TFCI is not expressed in 0 bit.

The CCC refers to the control command of CPCH in general or a control information of CPCH. Specifically, the CCC is either divided into a control information on a first layer L1 to transport the start of message indicator through DL DPCH and a control information having a phase higher than the first layer L1. In other words, the CCC may be a control information on the first layer L1 or a control information or a command of higher layers. Here, the length of the CCC transported through a CCC field may be a slot unit or a frame unit. For instance, the CCC may be a command or information of one slot length of one fine or of several frames. Such CCCs are transported to the CCC field of the DL DPCCH for CPCH. Each CCC corresponds to a particular sequence. Accordingly, the command or information of each CCC is distinguished by different sequences, The system either pre-set the information on these sequences or transports the information on the sequences in the course of operating the system through control channels such as a broadcast channel (BCH) of the 3 GPP or a forward access channel.

The Start of Message Indicator(SMI), which is one of the CCCs, is a control information of several frames.

For transport of the SMI, the base station transports a particular sequence for SMI to the CCC field of the DL DPCCH during the period of several frames. The base station system either pre-sets a sequence for the SMI or transports information on the sequence through a control channel such as the broadcast channel (BCH) or the forward access channel (FACH). All random sequences may be for the SMI, e.g., [0000], [1111], [1010], [0101], [1100], [0011], etc., which are repeatedly transported to each slot. For instance, the [1010] sequence is repeatedly transported to each slot during the period of several frames immediately after the power control preamble (PC-P) of 0 or 8 slot length of the CPCH.

In case a specific sequence is used for the SMI, other sequences other than the specific sequence for SMI may be used for other CCCs. For instance, in case the [1010] sequence is used for the SMI, other sequences other the [1010] sequence may be used for other CCCs.

The transport length of the SMI sequence is either pre-set or transported through a control channel such as the BCH or FACH of the 3 GPP system.

If no CCC information or command is transported through the CCC field, nothing or a particular pattern is transported to the CCC field. Such a particular pattern may be used for estimation of a channel or measurement of a power control.

To be specific, one of the patterns [0000], [1111], [11010], [0101], [1100], [0011], etc. not used in the ES is repeatedly transported to each slot. Preferably, when no CCC is transported to the CCC field, no pattern is transported to the CCC field. This means the power-off state of the CCC field. The CCC field becomes power-on only when a particular sequence is transported to transport the CCC.

Figure 7A:
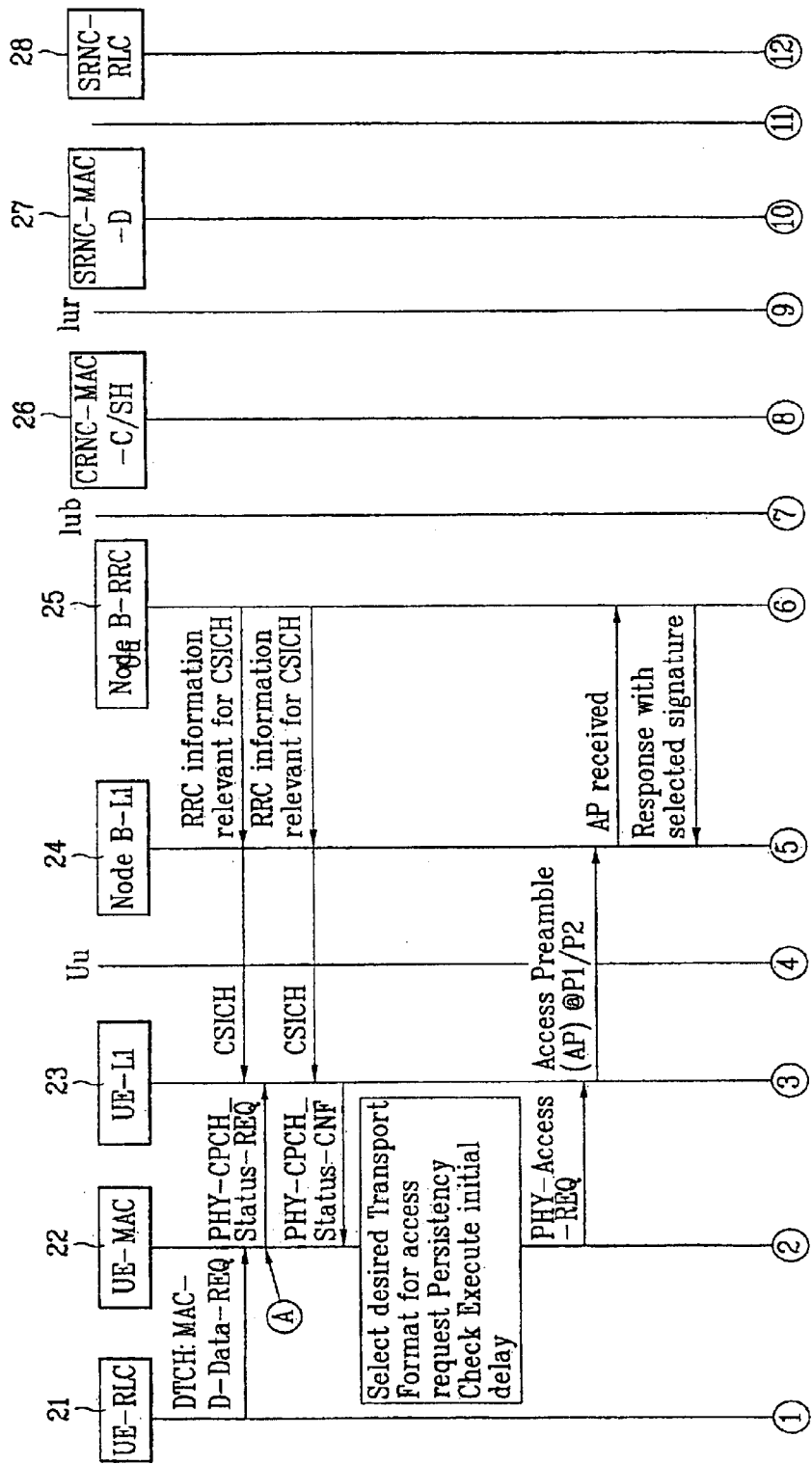
Figure 7B:
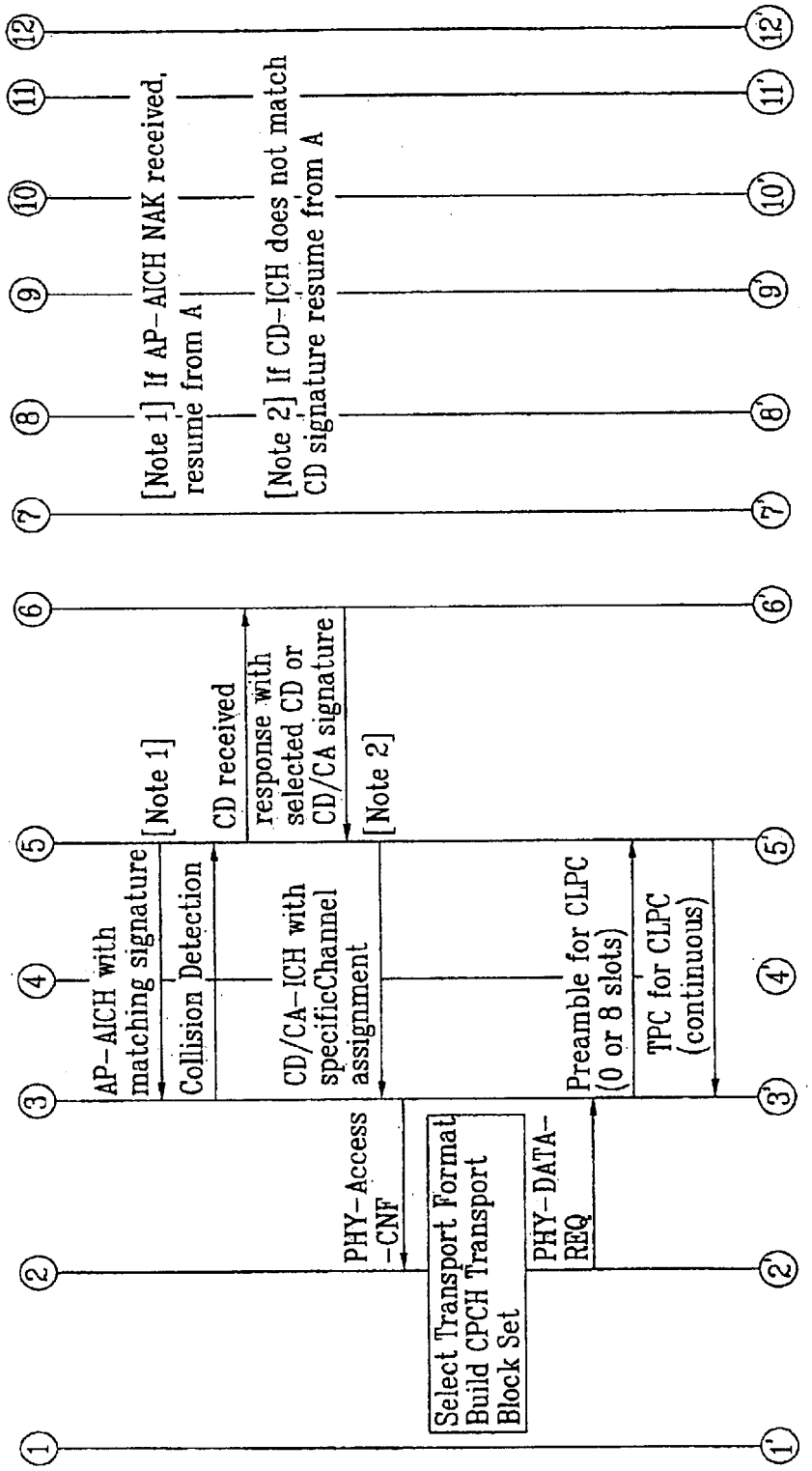

FIGS. 7A–7C are diagrams illustrating the process of transporting the normal CPCH according to the present invention.

The L1 layer 3 of the UE, which has received the ACK through AP-AICH, transports the CD-P to the L1 layer 4 of the base station (Node-B). The base station (Node-B), which has received the CD-P selects the specific signature and transports the CD/CA-ICH.

The CD/CA-ICH in the UCSM only reply to the CD-P, while the CD/CA-ICH in the VCAM performs a reply and a channel allocation for the CD-P. At this time, the information on the channel allocation in the VCAM defines a scrambling code for the PC-P and the CPCH message section (the CPCH message data section, the CPCH message control section) in the L1 layer 3 of the UE.

The MAC layer 2 of the UE, which has received the PHY-Access-CNF from the L1 layer of the UE, selects the transport format of the CPCH and requests the data transport through PHY-Data-REQ after making a transport block set.

The L1 layer 3 of the UE, which has received PHY-Data-REQ, transports the message after establishing the transport power control preamble (PC-P) of 0 or 8 slot length. The data transport through the CPCH is continuously performed until all the data are transported, or to the end of the maximum frame length designated by the system.

While the first transport block is transported, the Node B L1 24 transports the start of message indicator to the UE L1 23. The UE L1 23 determines whether or not a connect CPCH has been opened depending on receipt of the start of message indicator. If the UB L1 23 fails to receive the start of message indicator during the pre-set (predetermined) period of time, the transport of CPCH message is immediately interrupted. Otherwise, the UE L1 23 continues transport of the message. To be specific, the UE receives the start of message indicator transported to the DL DPCCH for CPCH during the Nsmi (Nstart of message indicator) frame after the PC preamble. If the UE L1 23 fails to receive the start of message indicator during the predetermined Nsmi frame, the UBE L1 23 interrupts the message transport and notifies the UE MAC 22 of a failure message.

However, if the UE L1 23 receives the start of message indicator during the predetermined Nsmi frame, the UE L1 23 continues to transport the message. Here, the Nsmi frame value is transported to the UE L1 23 in advance through a control channel such as the BCH or FACH in the form of a system information.

Meanwhile, the information on acknowledgement (ACK) or non-acknowledgement (NAK) of the radio network controller or of the RLC layer 28 is transported to the UE RLC 21 through the FACH.

FIGS. 7A–7C show from point A to point B the transporting process of the CPCH fox the first-transported transport block set. FIG. 7 also shows from point C to point D a transported process of the CPCH for transport of each consecutive transport block set.

FIG. 8 is a diagram illustrating a second format of the DL DPCCH for CPCH according to the present invention.

The second format of the DL DPCCH for CPCH according to the present invention is similar to the first format thereof as shown in FIG. 6. The only difference lies in that the TFCI of the DL DPCCH is 2 bits, and the CCC field is 2 bits.

In other words, FIG. 8 is a diagram illustrating a second format of the DL DPCCH for CPCH according to the present invention, and the TFCI field may be used for transporting information on the CPCH of the L1 and higher layers.

If the TFCI field is used for transporting the information on the CPCH control, the control information represented by an ordinary sequence such as the CCC field is transported. For instance, it is possible to transport the control information represented by a TFCI codeword by using a TFCI encoding and a TFCI mapping manner with respect to the physical channel. Here, even if the information transported to the TFCI field is a control information of the CPCH, the physical operating manner thereof is the same as the TFCI.

Otherwise the information transported to the TFCI field or to the CCC field may be constructed so as to be simultaneously or separately transported. If constructed to be separately transported, the sequences of 4 bits for the start of message indicator is transported in the same manner as for the CCC field of 4 bit by considering the TFCI of 2 bits and the CCC field of 2 bits as a field of 4 bits.

If constructed to be simultaneously transported, the sequences for the SMI is constructed to be 2 bits per slot such as [11], [00], [10], Lol), etc., thereby being transported to the CCC field of 2 bits. The operating manner of the CCC of 2 bits is the same as that of the CCC of 4 bits stated above except that the length of the sequence per slot is 2 bits.

As described above, the present invention has an effect of preventing an overlapped use of the CPCH currently on use by the UE, thereby providing stable telecommunication services.

The foregoing embodiments are merely exemplary and are not to be construed as limiting the present invention. The description of the present invention is intended to be illustrative, and not to limit the scope of the claims. Many alternatives, modifications, and variations will be apparent to those skilled in the art.

What is claimed is:

1. A method of data transmission on a common packet channel (CPCH) for a communication system, comprising:
sending a common packet channel control command (CCC) through a dedicated physical channel (DPCH) when a power control premable is sent; and
sending a common packet channel message through the common packet channel (CPCH) if the common packet channel control command (CCC) is received within a predetermined time.

2. The method of claim 1, wherein the common packet channel control command (CCC) is a message start indicator indicating a start of the common packet channel message between a node and a user equipment.

3. The method of claim 1, wherein the common packet channel control command comprises one of 1 slot, 1 frame and more than 2 frames.

4. The method of claim 2, wherein the message start indicator is sent through a downlink dedicated physical control channel (DL-DPCCH) after transmitting a transport format combination indicator (TFCI) of the power control preamble.

5. The method of claim 1, wherein a field for the common packet channel control command transmitted to the user equipment is used for measurement performing a channel estimation or the power control during a time that the common packet channel control command is not used as a start of message indicator.

6. The method of claim 2, wherein the user equipment sends the common packet channel message to the node when the user equipment received the start of message indicator within the predetermined time.

7. The method of claim 2, wherein the user equipment stops the transmission of the common packet channel message which is sent to the base station when the user equipment does not received the start of message indicator within the predetermined time.

8. The method of claim 1, wherein the DPCH, includes a dedicated physical control channel (DPCCH) for the common packet channel, the DPCCH comprises a pilot field, a transmit power control (TPC) field, a format combination identifier (TFCI), and the common packet channel control command (CCC).

9. The method of claim 8, wherein the pilot field is at least 4 bits ($N_{pilot}$) the transmit power control (TPC) field is at least 2 bits ($N_{TPC}$), the common packet channel control command (CCC) is at least 4 bits ($N_{CCC}$), and the transport format combination identifier (TFCI) is 0 bits ($N_{TCF}$).

10. The method of claim 8, wherein the transmit power control (TPC) field, the transport format combination identifier (TFCI), and the common packet channel control command (CCC) are at least 2 bits, and the pilot field is at least 4 bits.

11. The method of claim 1, wherein the transmission of the common packet channel message is stopped if the common packet channel control command is not received.

12. A base station, comprising:
means for receiving a power control (PC) preamble; and
means for generating a downlink (DL) dedicated physical control channel (DPCCH) for a common packet channel (CPCH) signaling, wherein the DL DPCCH includes common packet channel control command (CCC) to support the CPCH, wherein the CCC indicates a start of a message through the CPCH.

13. A user equipment (UE), comprising:
means for generating a power control (PC) preamble;
means for receiving a downlink (DL) dedicated physical control channel (DPCCH) for a common packet channel (CPCH);
means for detecting a common packet channel control command (CCC) in the DL DPCCH; and
means for transmitting information data through the CPCH upon detection of the CCC.

14. The UE of claim 13, wherein the CPCH is aborted if there is no detection of the CCC, wherein the CCC indicates a start of a message through the CPCH.

15. A method for transmitting a packet information through a common packet channel (CPCH), comprising:
initiating procedures to access the CPCH for transmitting the packet data; detecting a message start indicator from a dedicated physical channel (DPCH) for the CPCH transmitted on a frame by frame basis after power control preamble of the initiation step; and
one of initiating packet information transmission if the message start indicator is detected and stopping an access attempt of the CPCH if the message start indicator is not detected.

16. The method of claim 15, wherein the packet information includes a CPCH message data part and a CPCH message control part.

17. The method of claim 15, wherein the message start indicator is contained in a common packet channel control command of a downlink dedicated physical control channel (DPCCH) of the DPCH.

18. The method of claim 15, wherein the DPCH comprises a dedicated physical data channel (DPDCH) and a dedicated physical control channel (DPCCH), wherein a portion of the DPDCH is used for the start of message indicator.

19. The method of claim 1, wherein the common packet channel control command (CCC) is one of a message start indicator and a higher layer control command.

20. The method of claim 19, wherein the common packet channel control command is used to stop transmission.

21. The method of claim 20, wherein the common packet channel control command comprises 4 bits of [1111].

22. The method of claim 1, wherein the common packet channel control command comprises 4 bits of [1010].

23. The method of claim 1, wherein the common packet channel control command is a start of message indicator, which is sent by a node B layer while a first transport block of the common packet channel message is being sent and allows a user equipment (UE) to know whether or not a correct CPCH channel is being used.

24. The method of claim 23, wherein if the user equipment (UE) does not receive the start of message indicator within the predetermined time, the user equipment (UE) immediately stops the common packet channel message transmission; otherwise, the user equipment (UE) continues the common packet channel message transmission.

25. The method of claim 24, wherein the power control preamble is sent during a 0 or 8 slot period.

26. The method of claim 1, wherein the common packet channel control command comprises 4 bits, wherein 4 bits is any one of random sequences.

27. The user equipment (UE) of claim 13, wherein the common packet channel control command (CCC) is one of a message start indicator information and a higher layer control command.

28. The user equipment (UE) of claim 27, wherein the common packet channel control command is used to stop transmission.

29. The user equipment (UE) of claim 28, wherein the common packet channel control command comprises 4 bits of [1111].

30. The user equipment (UE) of claim 13, wherein the common packet channel control command comprises 4 bits of [1010].

31. The user equipment (UE) of claim 13, wherein the common packet channel control command comprises 4 bits, wherein 4 bits is any one of random sequences.

32. The base station of claim 12, wherein the start of message indicator is sent by the base station while a first transport block of a message is being sent and allows a user equipment (UE) to know whether or not a correct CPCH channel is being used.

33. The base station of claim 32, wherein if the UE does not receive the start of message indicator within a certain period, the UE immediately stops the message transmission; otherwise, the UE continues the message transmission.

34. The method of claim 15, wherein the message start indicator is sent by a node B layer while a first transport block of the packet data is being sent and allows a user equipment (UE) to know whether or not a correct CPCH channel is being used.

35. The method of claim 34, wherein if the UE does not receive the message start indicator within a certain period, the UE immediately stops the packet data transmission; otherwise, the UE continues the packet data transmission.

36. A method of transmitting data on a common packet channel (CPCH) for a communication network including a user equipment (UE) and a node B comprising:

performing at the user equipment a power ramping cycle for an access preamble (AP);

registering an acquisition of the access preamble on an access preamble acquisition indicator channel (AP-AICH);

sending from the user equipment to the node B a collision detection (CD) preamble on a physical common packet channel (PCPCH);

registering reception at the node B of the collision detection preamble on a collision detection indicator channel (CD-ICH);

transmitting from the user equipment to the node B a first transport block of a message through the common packet channel;

sending from the node B to the user equipment a start-of-message indicator (SMI) through a dedicated physical control channel (DPCCH), while the first transport block is being sent from the user equipment to the node B; and continuing the transmission of the common packet channel message upon reception within a predetermined time of the start-of-message indicator; otherwise, stopping the transmission of the message.

37. The method of claim 36, wherein the communication network exists between the user equipment (UE) and the node B, wherein the UE includes a UE radio link control (UE-RLC) layer, a UE medium access control (UE-MAC) layer, and a UE-L1 layer, and the node B includes a node B-L1 layer and a node B radio resource control (RRC) layer, and wherein:

a MAC-D-Data-REQ primitive is sent through a dedicated traffic channel (DTCH), first RRC information relevant for a CPCH status indicator channel (CSICH) is transmitted from the node B-RRC to the UE-L1, a PCPCH status request (REQ) primitive is sent from UE-MAC to UE-L1, second RRC information relevant for the CSICH is transmitted from the node B-RRC to the UE-L1, and a PCPCH status confirmed (CNF) primitive is sent from UE-L1 to UE-MAC, the UE-MAC executes a persistency check and delay, selects a transport format for requesting CPCH access from the CSICH, and sends a PHY-Access REQ primitive from UE-MAC to UE-L1, an access preamble (AP) is transmitted, at ramping powers P1 and P2, from UE-L1 to node B-L1 and forwarded to node B-RRC based on a receipt at the UE of an AP-AICH signature generated at node B-RRC and forwarded to UE-L1, wherein said power ramping cycle is performed anew if the AP-AICH signature indicates a no acknowledgment (NAIK) condition;

a collision detection (CD) preamble is transmitted through the PCPCH from UE-L1 to node B-L1 and forwarded to node B-RRC, a CD of CD/CA signature is sent through a collision detection and collision assignment indicator channel (CD/CA-ICH) from node B-RRC to node B-L1 based on a signature of the received CD preamble, wherein said power ramping cycle is performed anew if there is no match for the CD signature;

the UE-MAC selects a transport format to build a CPCH transport block set and then sends a PHY-Data-REQ primitive form UE-MAC to UE-L1.

a closed loop power control (CLPC) preamble is transmitted from UE-L1 to node B-L1 and a corresponding transmit power control (TCP) preamble is transmitted from node B-L1 to UE-L1, a CPCH control command containing the SMI is transmitted through a dedicated physical channel (DPCH) from node B-L1 to UE-L1, and a PHY-STATUS-IND primitive is sent from UE-L1 to UE-MAC to indicate that normal transmission is established, while a first PHY-DATA-IND primitive is sent from a CRNC-MAC-C/SH layer of the communication network and first MAC-DATA-IND primitive is sent to the CRNC-MAC-C-C/SH layer to an SRNC-RLC layer of the communication network, and for each transport block set, a MAC-DATA-REQ primitive is sent from UE-RLC to UE-MAC and a PHY-DATA-REQ primitive is transmitted from UE-MAC to UE-L1 in the user equipment, and a second PHY-DATA-IND primitive is sent to the CRNC-MAC-C/SH layer and a second MAC-DATA-IND primitive is sent from the CRNC-LMAC-C/SH layer to the SRNC-RLC layer in the node B.

* * * * *

UNITED STATES PATENT AND TRADEMARK OFFICE
CERTIFICATE OF CORRECTION

PATENT NO. : 6,795,412 B1
DATED : September 21, 2004
INVENTOR(S) : Young Dae Lee It is certified that error appears in the above-identified patent and that said Letters Patent is hereby corrected as shown below:

Title page,
Item [56], References Cited, U.S. PATENT DOCUMENTS, please add -- 6,269,088 B1   7/2001   Masui et al. …….. 370/335 -- and
FOREIGN PATENT DOCUMENTS, please add -- 9-55693   2/1997   Japan --

Signed and Sealed this

Twenty-second Day of March, 2005

JON W. DUDAS
*Director of the United States Patent and Trademark Office*